United States Patent [19]

Parkinson et al.

[11] Patent Number: 5,160,369
[45] Date of Patent: Nov. 3, 1992

[54] MECHANICALLY ERASABLE BALLPOINT INK

[75] Inventors: Dean B. Parkinson, Redwood City; Orton D. Bergren, Menlo Park, both of Calif.

[73] Assignee: SRI Inc., Menlo Park, Calif.

[21] Appl. No.: 659,776

[22] Filed: Feb. 21, 1991

[51] Int. Cl.$^5$ ............................................. C09D 11/18
[52] U.S. Cl. ................................. 106/19 R; 106/32
[58] Field of Search ............... 106/30, 20, 27, 32; 524/460, 88, 161

[56] References Cited

U.S. PATENT DOCUMENTS

| | | |
|---|---|---|
| 4,329,262 | 5/1982 | Muller . |
| 4,578,117 | 3/1986 | Nakanishi ........................... 106/20 |
| 4,606,769 | 8/1986 | Tanaka et al. ...................... 106/30 |
| 4,629,248 | 12/1986 | Miyajima . |

Primary Examiner—William R. Dixon, Jr.
Assistant Examiner—Helene Klemanski
Attorney, Agent, or Firm—John Y. Chen; John S. Bell

[57] ABSTRACT

The present invention provides ballpoint pen ink compositions containing carbon black which are initially erasable and require little or no external pressure for ink delivery. The ink can be erased easily with a normal rubber eraser such as that found on pencils. The ink compositions of the present invention comprises: about 15% to about 40% of an aliphatic hydrocarbon, about 15% to about 40% of an aromatic hydrocarbon, about 1% to about 15% of a colorant, about 4% to about 40% of one or more of a preselected thermoplastic block copolymer, and about 5% to about 40% of a preselected parting agent.

13 Claims, No Drawings

MECHANICALLY ERASABLE BALLPOINT INK

TECHNICAL FIELD OF THE INVENTION

The present invention is related to initially erasable ballpoint ink compositions.

BACKGROUND ART

Mechanically erasable ballpoint inks are known in the art, see: JP.56-76477; Ger. Offen. DE 3,230,473, PCT Int. Appl. WO 84 00 174; PCT Int. Appl. WO 83 01 625; U.S. Pat. Nos. 4,097,290; 4,407,985; 4,349,639; 4,329,262; 4,367,966; 4,391,927; 4,410,643; 4,508,570; 4,252,727; 3,907,694; and 4,470,079.

More specifically, U.S. Pat. No. 4,410,643 discloses an erasable ink composition which includes styrene-butadiene, carbon black, volatile and non-volatile solvents. U.S. Pat. No. 4,391,927 discloses Kraton 1107 and Kraton 1101 ink compositions. The compositions further includes a hydrocarbon solvents as well as a pigments. U.S. Pat. Nos. 4,407,985 and 4,329,262 all disclose compositions similar to the 4,410,643 patent. These patents relate to erasable inks which include styrene-butadiene. U.S. Pat. No. 4,508,570 discloses an ink composition which includes polyethylene glycol 200, ether and black dye. U.S. Pat. No. 4,252,727 relates to a composition which includes a butadiene styrene copolymer as well as carbon black. U.S. Pat. No. 3,907,694 discloses a composition which includes polyethylene glycol, ether and carbon black. U.S. Pat. No. 4,470,079 discloses an ink composition which includes styrene as well as butadiene having amino groups attached thereto. U.S. Pat. No. 4,097,290 describes a initially erasable ballpoint ink containing rubber, low and high boiling solvents, pigments, and solid lubricants (stearic and lauric acid). PCT Int. Appl. WO 83 01 625 describes erasable inks containing thermoplastic block copolymers, a "critical pigment concentration", solvent, and dioctylphthalate. Japanese application 56-76477 describes erasable ballpoint pen inks containing vinyl chloride, plasticizers, pigments and, solvents.

Various additives are well known as disclosed in . European Patent Application EP 190002 A2, Japanese Patent No. 83155297, and Japanese patent No. 60047082.

European Patent Application EP 190002 A2 describes the use of fatty acid esters in flushing-resistant textile printing pastes. Japanese Patent No. 83155297 (83.08.25) describes a water thinned writing ink containing polyethylene glycol esters for ballpoint pens. Japanese patent No. 60047082 A describes an aqueous ink composition for ballpoint pen comprising dyes, water and polyoxyethylene derivatives including polyethylene glycol monopalmitate, polyethylene glycol distearate, and polyethylene glycol monooleate.

The cited application publications and patents are herein incorporated by reference.

In general, prior art erasable inks employ graphite, organic or metalorganic pigments. Conventional mechanically erasable inks containing carbon blacks require external pressure for release from ballpoint pens. The pressure causes the ink to ooz or droop from the pen during nonwriting periods which easily stains clothing and the user's fingers during handling. The use of graphite results in excessive ballpoint pen ball wear; whereas, organic dyes or metalorganic pigments lack the writing quality of inks containing carbon blacks. The poor quality is due to the inherent character of the dyes and pigments, e.g., decreased opacity or binding power. Although polyoxyethylene derivatives have been used in ballpoint inks, such prior art inks are aqueous and non-erasable by their nature.

It is, therefore, an object of the present invention to provide erasable ink compositions substantially free of one or more of the disadvantages of the prior art.

DISCLOSURE OF THE INVENTION

The erasable ink compositions of the invention exhibits certain advantages which makes them extremely suitable for use in ballpoint pens. Most importantly, the ink compositions of the invention exhibit an "initial erasable period" during which it can be erased using common types of rubber erasers. The ink compositions of the present invention comprises: about 15% to about 40% of an aliphatic hydrocarbon, about 15% to about 40% of an aromatic hydrocarbon, about 1% to about 15% of a colorant, about 4% to about 40% of one or more of a preselected thermoplastic block copolymer, and about 5% to about 40% of a preselected parting agent.

MODE(S) FOR CARRYING OUT THE INVENTION

The present invention refers to an initially erasable ballpoint ink containing carbon black or, alternatively, other colorant, and requiring little or no external pressure for ink delivery. The ink can be erased easily with a normal rubber eraser such as that found on pencils. The added advantage of the ink compositions is that when used in combination with a ballpoint, the ink requires substantially no external pressure for ink delivery.

Suitable aliphatic hydrocarbons useful in the instant invention includes oliphatic hydrocarbons and petroleum napthas having a boiling point less than about 150° C. such as heptane, 2,2,4-trimethylpentene, methylcyclohexane, cyclo-hexane, V.M. and P. naptha with boiling point of 118°–138° C., isoparaffins such as Shell Sol 70, 71, and 72 with boiling points in the range of about 116°–127° C. and petroleum napthas such as Shell Sol B with boiling points of 57°–82° C. Union Oil solvents such as Amsco Lactol Spirits with boiling point of about 95°–107° C.; Amsco Rubber Solvent with boiling point of about 46°–117° C.; Amsco Special Naptholite with boiling point of about 118°–144° C.; Amsco Textile Spirits with boiling point of about 63°–80° C.; Napthol Spirits with boiling point of 62° C.; rubber solvent with boiling point of about 60° C. and Hi-Flash Naptha with boiling point of about 82° C.

The aliphatic hydrocarbons incorporated in the ink compositions of the invention can be in amounts of about slightly less than about 15% to about 40% or more by weight, preferably about less than 20% to about 40% by weight, more preferable about 20% to about 40% based on the ink compositions so that the ink composition has a viscosity suitable for ink flow from a ballpoint pen.

The aromatic hydrocarbons having a boiling point in the range of about 40° C. to about 280° C. are suitable for use in the invention. These includes simple aromatic hydrocarbons and aromatic petroleum fractions such as Toluene with boiling point of about 109°–111° C., Xylene with boiling point of about 137°–144° C., Trimethyl benzene with boiling point of about 169.8° C., and Union Oil's Amsco Solv G and Amsco Solv H-SB 1348 with boiling points in the ranges of about 182°–206° C. and 181°–280° C., respectively.

The aromatic hydrocarbons are usually contained in the ink composition in amounts of about 15–40% by weight, preferably about 16–25% by weight, based on the ink composition so that the ink composition has a viscosity suitable for ink flow from a ballpoint pen.

The carbon blacks suitable for use should be of small particle size (channel black, furnace black, etc.) such as Mogul L, Regal 400R, Regal 660R, Regal 500R, and Regal 330R manufactured by Cabot Corporation. Other colorants such as Phthalocyanine blue, Alkaline blue, Lithol rubine red, and diarylide yellow can also be used.

Thermoplastic block copolymers which are of advantage in the ink compositions are low molecular weight block copolymers (triblock, diblock disymmetric triblock, disymmetric triblock with tapered block, and branched). Suitable thermoplastic block copolymers include triblocks, such as, poly(styrene-butadiene-styrene), poly(styrene-isoprene-styrene) and poly(styrene-ethylene-butylene-styrene), poly(styrene-butadiene)$_n$, poly(styrene-isoprene)$_n$ which are capable of providing low viscosity solutions. Other suitable block copolymers include diblocks, such as, poly(styrene-butadiene) and poly(styrene-isoprene).

Of all block copolymers which are of advantage in the present invention, the branched copolymers are less preferred, the diblocks are more preferred, and the linear triblocks are especially preferred. All are of advantage due to their selected low molecular weight as characterized by Brookfield Viscosity values.

Blends of one or more block (triblock, diblock, disymmetric triblock, disymmetric triblock with tapered block, and branched) copolymers can also be used in the invention.

Typical examples of commercially available thermoplastic triblock copolymers are Kraton 1101, 1102, 1107, 1111, 1112, 1117, G1652, G1726X, G1657X and the like produced by the Shell Chemical Company. Examples of suitable diblock copolymers include Kraton D1118X and the like from Shell. Example of suitable branched copolymers include Kraton D1320X and the like from Shell. Other examples of commercially available linear triblock and diblock thermoplastic block copolymers include various grades of Solprene ® from Phillips, Cariflex TR ® from Shell, Tufprene ® and Asaprene ® from Asahi, Europrene SOL T ® from Anic, Buna BL ® from Bayer, Eltar ® from Icechim-Romania, Stereon ® from Firestone and the like. For further information concerning the chemistry and properties of such polymers, reference is made to the "Encyclopedia of Polymer Science and Engineering", vol 2, pp 324–434, section on "*Block Copolymers*", by Reiss, Gerard, et al. This article is incorporated herein by reference.

The low viscosity requirement of the instant ink compositions are important. Such low viscosity solutions are of advantage in the present invention. The invention requires that the thermoplastic block copolymers be of low molecular weight as characterized by Brookfield Viscosity measurements. Suitable thermoplastic block copolymers should have a Brookfield Viscosity in Toluene at 23° C. with a net polymer concentration of 25% weight of about 160 to about 4,500 cps. Examples of low molecular weight block copolymers as characterized by typical Brookfield Viscosity (cps) include: Kraton block copolymers from Shell such as 1101/4000 cps, 1102/1200 cps, 1107/1600 cps, 1111/1300 cps, 1112/900 cps, 1117/500 cps, 1118X/850 cps, G1652/1350 cps, G1657X/4200 cps, etc.

Parting agents useful in the present invention include: polyethylene glycol monstearate (PEGMS), polyethylene glycol distearate (PEGDS), polypropylene oxide glycol distearate (PPOGDS), polypropylene glycol ester of fatty acid (PPGEFA), polytetramethylene oxide glycol distearate (PTMOGDS) and the like. For example, polyethylene glycol distearate useful in the invention can have a molecular weight average in the range of about 300 to about 2,000. Molecular weights substantially greater than 2,000 are insoluble in hydrocarbon solvents at room temperature. The molecular weights can be determined by HPLC/GPC techniques.

Without being bound by theory, we believe the advantages of the parting agents used in the instant ink compositions are due to the polarity of the glycol moiety in the distearates. The polarity causes the distearate(s) to migrate to the paper-ink interface from the liquid ink resulting in and "initial period" loss of adhesion.

PPGEFA are available from Rhone-Poulene, PEGDS are available from Arol Chemical Products Company, Eastern Color & Chemical Company, GAF Corporation, The C. P. Hall Company, Lonza Inc., Moretex Chemical Products, Inc., PPG Industries, Inc., Stepan Company, and Witco Corporation. PEGMS is available from PPG Industries, Inc., and PEGDFA is available from Petrochemicals Division of ICI. For the most part, the parting agents of the invention are also available from Aldrich Chemical Company.

The erasable ink composition of the invention may contain an additional surfactant to stabilize the colorant dispersion and to further facilitate erasability. The surfactants used are, for example, anionic surfactants such as sodium diakylsulfo-succinate, and a polyoxyethylene glycol alkyl sulfate, and nonsurfactants such as 2, 4, 7, 9 tetramethyl 5-decyn 4,7 diol and block copolymers of ethylene and propylene oxides and the like.

The erasable ink compositions may be prepared by any method heretofore known in the preparation of rubber solutions. The preferred method may be as follows.

The thermoplastic block copolymer is combined with colorant on a rubber mill operated at about 110°–120° C. or in an intensive mixer such as a Banbury using the art common to rubber processing technology. The polyethylene glycol distearate is dissolved in the aliphatic-aromatic solvent mixture by heating the mixture until solution is achieved. After cooling to about 20° C. this solution is combined with the pigmented block copolymer and other additives using a simple mixing technique with a dough mixer or the like. The finished ink formulation is then charged into an ink chamber of the ballpoint pen. The ink is then tested by writing on bond paper and the erasability tested by one or more strokes of the eraser on a #1 pencil manufactured by the Faber-Castell Corporation.

The writing of carbon black pigmented inks was treated for opacity by comparison to the opacity of markers made with an H lead pencil. The opacity is shown by the marks A and B, wherein A means that the writing was as opaque as that of a mark made with an H lead pencil and B where the writing was less opaque than that of a mark made with an H lead pencil. The erasability of the writing is shown below by the marks A, B, and C, wherein A means that the writing was perfectly erased with one stroke of the eraser on a #1 pencil manufactured by the Faber-Castell Corporation. B means that the writing was perfectly erased with two strokes of the above eraser, and C means that it was imperfectly erased or not erased by the #1 pencil eraser.

Examples of the invention are provided in the following examples with ingredients listed in parts by weight.

EXAMPLE 1

| | |
|---|---|
| Kraton 1102 (Shell Chemical Co.) | 29.76 |
| Mogul L carbon black (Cabot) | 5.95 |
| Poly(ethyleneglycol) distearate (600 mol. wt.) | 15.18 |
| Petroleum ether (bp. 50–110° C.) | 29.46 |
| Toluene | 19.64 |
| Writing opacity | A |
| Erasability | A |

EXAMPLE 2

| | |
|---|---|
| Kraton 1102 | 18.11 |
| Mogul L | 5.40 |
| Polyethylene glycol 600 distearate | 18.11 |
| Petroleum ether (bp. 50–110° C.) | 19.46 |
| Toluene | 38.92 |
| Writing opacity | A |
| Erasability | A |

EXAMPLE 3

| | |
|---|---|
| Kraton 1102 | 34.06 |
| Mogul L | 6.37 |
| Polyethylene glycol 600 distearate | 8.51 |
| Petroleum ether (bp. 50–110° C.) | 30.64 |
| Toluene | 20.43 |
| Writing opacity | A |
| Erasability | A |

EXAMPLE 4

| | |
|---|---|
| Kraton 1102 | 24.33 |
| Mogul L | 4.87 |
| Polyethylene glycol 600 distearate | 12.41 |
| Petroleum ether (50–110° C.) | 35.03 |
| Amsco Solvent G (Union Oil Co.) | 23.35 |
| Writing opacity | A |
| Erasability | A |

EXAMPLE 5

| | |
|---|---|
| Kraton 1102 | 24.33 |
| Alkali Blue | 3.00 |
| Vaictoria Blue | 3.00 |
| Polyethylene glycol 600 distearate | 12.41 |
| Petroleum ether (50–110° C.) | 35.03 |
| Amsco Solvent G (Union Oil Co.) | 23.35 |
| Erasability | A |

EXAMPLE 6

In order to demonstrate the requirement for a high molecular weight block thermoplastic copolymer, the following was prepared and tested:

| | |
|---|---|
| Solprene ® 414 P (Phillips Petroleum) (a radial block thermoplastic copolymer) | 25.25 |
| Mogul L | 5.05 |
| Polyethylene glycol 600 distearate | 12.88 |
| Petroleum ether (bp. 50–110° C.) | 34.09 |
| Toluene | 22.73 |
| Writing opacity | B |
| Erasability | A |

The ink of this example would not continue to feed on continuous writing.

EXAMPLE 7

Following Example 4 other block copolymers (Kraton 1101, 1102, 1107, 1111, 1112, 1117, G1652, G1726X, G1657X) are tested and the results are found to be substantially the same.

EXAMPLE 8

Following Example 7 other parting agents (polyethylene glycol monstearate, polyethylene glycol distearate (300 mol. wt.), polypropylene oxide glycol distearate, or polytetramethylene oxide glycol distearate) are tested and the results are found to be substantially the same.

EXAMPLE 9

Following Example 7 other parting agents (polyethylene glycol distearate having (300, mol. wt.), (400 mo., wt.), (1,500 mol. wt.) are tested and the results are found to be substantially the same.

EXAMPLE 10

Ink compositions of Examples 1, 2, 3, 4, and 7 are formulated without parting agents and tested. The results obtained are as follows:

| | |
|---|---|
| Writing opacity | A |
| Erasability | C |

While certain features of this invention have been described in detail with respect to various embodiments thereof, it will, of course, be apparent that other modifications can be made within the spirit and scope of this invention, and it is not intended to limit the invention to the exact details shown above except insofar as they are defined in the following claims.

What we claim is:

1. An erasable ballpoint ink compositions comprising:
   a) about 15% to about 80% by weight of a hydrocarbon solvent,
   b) about 1% to about 15% by weight of a colorant,
   c) about 4% to about 40% by weight of a thermoplastic hydrophobic hydrocarbon block copolymer, and
   d) about 5% to about 40% by weight of a fatty acid ester of polyalkylene ether parting agent.

2. An erasable ballpoint ink according to claim 1, wherein said thermoplastic block copolymer has a Brookfield Viscosity of about 160 to about 4,500 cps.

3. An erasable ballpoint ink according to claim 1, wherein said fatty acid ester parting agent has a molecular weight of about 300 to about 2,000.

4. An erasable ballpoint ink according to claim 1, wherein said hydrocarbon solvent comprises about 15% to about 40% by weight of the ink of an aromatic hydrocarbon having a boiling point in the range of about 40° C. to about 280° C.

5. An erasable ballpoint ink according to claim 4, wherein said hydrocarbon solvent comprises about 15% to about 40% by weight of the ink of an aliphatic hydrocarbon having a boiling point of less than 150° C.

6. An erasable ballpoint ink according to claim 1, wherein said colorant is carbon black.

7. An erasable ballpoint ink according to claim 1, wherein said parting agent is polyethyleneglycol distearate having a molecular weight average in the range of about 300 to about 2,000.

8. An erasable ballpoint ink according to claim 1 wherein said fatty acid ester functions as a parting agent which permits the ink to be erased, and as a wetting agent that improves ink flow, and as a plasticizer which causes the ink to be soft and flexible when dry, and wherein said ester is selected from the group consisting of fatty acid monoesters of polyalkylene ether and fatty acid diesters of polyalkylene ether.

9. An erasable ballpoint ink according to claim 8, wherein said fatty acid ester is selected from the group consisting of polyethylene glycol monostearate, polyethylene glycol distearate, polypropylene oxide glycol distearate, or polytetramethylene oxide glycol distearate.

10. An erasable ballpoint ink according to claim 1 wherein said block copolymer is an aromatic aliphatic hydrocarbon block copolymer.

11. An erasable ballpoint ink according to claim 10, wherein said thermoplastic block copolymer is selected from one or more of the following:
  poly(styrene-butadiene-styrene), poly(styrene-butadiene),
  poly(styrene-butadiene)$_n$, poly(styrene-isoprene-styrene),
  poly(styrene-isoprene), poly(styrene-isoprene)$_n$, and
  poly(styrene-ethylene-butylene-styrene).

12. An erasable ink for use in a ballpoint writing instrument comprising: one or more of a thermoplastic block copolymer, a colorant, a hydrocarbon solvent, and a fatty acid ester of polyalkylene ether which functions as a parting agent, a wetting agent, and a plasticizing agent, and is substantially the only plasticizing agent, wetting agent, or plasticizing agent material included in the ink.

13. An erasable ballpoint ink according to claim 12 wherein:
  said thermoplastic block copolymer is a hydrocarbon thermoplastic block copolymer;
  said fatty acid ester is selected from the group consisting of polyethylene glycol monstearate, polyethylene glycol distearate, polypropylene oxide glycol distearate, or polytetramethylene oxide glycol distearate; and
  the ink further includes a stabilizing surfactant.

* * * * *